(12) United States Patent
Hattori et al.

(10) Patent No.: US 11,608,102 B2
(45) Date of Patent: Mar. 21, 2023

(54) VEHICLE AND IN-VEHICLE CONTROL METHOD (71) Applicant: KYOCERA Corporation, Kyoto (JP)

(72) Inventors: Shigeto Hattori, Yokohama (JP); Kazuhiro Murakami, Machida (JP)

(73) Assignee: KYOCERA Corporation, Kyoto (JP)

(*) Notice: Subject to any disclaimer, the term of this patent is extended or adjusted under 35 U.S.C. 154(b) by 897 days.

(21) Appl. No.: 16/078,717

(22) PCT Filed: Feb. 7, 2017

(86) PCT No.: PCT/JP2017/004403
§ 371 (c)(1),
(2) Date: Aug. 22, 2018

(87) PCT Pub. No.: WO2017/145742
PCT Pub. Date: Aug. 31, 2017

(65) Prior Publication Data
US 2019/0054947 A1 Feb. 21, 2019

(30) Foreign Application Priority Data

Feb. 23, 2016 (JP) .............................. JP2016-032314

(51) Int. Cl.
*G05D 1/00* (2006.01)
*G05D 3/00* (2006.01)
(Continued)

(52) U.S. Cl.
CPC ............... *B62D 1/08* (2013.01); *B62D 1/046* (2013.01); *B62D 15/029* (2013.01); *G05G 1/10* (2013.01);
(Continued)

(58) Field of Classification Search
CPC ........ B62D 1/08; B62D 1/046; B62D 15/029; G08G 1/166; G08B 6/00; G05G 1/10; G05G 5/28; G06K 9/00805
See application file for complete search history.

(56) References Cited

U.S. PATENT DOCUMENTS 5,823,666 A * 10/1998 Kingsolver .......... B60Q 1/1484
362/488
5,955,944 A * 9/1999 Donner ................ B60Q 1/1484
340/475
(Continued)

FOREIGN PATENT DOCUMENTS

CN 204526985 U 8/2015
EP 2166525 A1 3/2010
(Continued)

OTHER PUBLICATIONS

Machine translation—JP 2013169952A by Shinji (Year: 2012).*
Machine translation—CN 204526985 by Tong (Year: 2015).*

*Primary Examiner* — Harry Y Oh
(74) *Attorney, Agent, or Firm* — Studebaker & Brackett PC (57) ABSTRACT A vehicle comprising a steering wheel; a steering switch disposed on the steering wheel; an other-vehicle-detector for detecting another vehicle; a tactile sensation presentation unit for presenting a tactile sensation to an operator by vibrating the steering switch; and a controller configured to, according to detection by the other-vehicle-detector, cause the tactile sensation presentation unit to vibrate the steering switch to present a tactile sensation to the operator.

8 Claims, 9 Drawing Sheets

(51) Int. Cl.
*G06F 7/00* (2006.01)
*G06F 17/00* (2019.01)
*B62D 1/08* (2006.01)
*G08B 6/00* (2006.01)
*G08G 1/16* (2006.01)
*B62D 1/04* (2006.01)
*B62D 15/02* (2006.01)
*G05G 1/10* (2006.01)
*G05G 5/28* (2006.01)
*G06V 20/58* (2022.01)

(52) U.S. Cl.
CPC ............... *G05G 5/28* (2013.01); *G08B 6/00* (2013.01); *G08G 1/166* (2013.01); *G06V 20/58* (2022.01)

(56) References Cited

U.S. PATENT DOCUMENTS

| | | | | |
|---|---|---|---|---|
| 6,144,297 | A * | 11/2000 | Donner | B60Q 1/1484 200/61.27 |
| 9,162,698 | B2 | 10/2015 | Hatanaka et al. | |
| 2003/0197601 | A1 * | 10/2003 | Takagi | G08G 1/16 340/407.1 |
| 2003/0229447 | A1 * | 12/2003 | Wheatley | B62D 15/029 701/300 |
| 2005/0039969 | A1 * | 2/2005 | Laukkanen | B60Q 1/1461 180/333 |
| 2005/0062590 | A1 * | 3/2005 | Lang | B60D 1/62 340/431 |
| 2008/0119993 | A1 * | 5/2008 | Breed | G01S 7/023 701/46 |
| 2009/0073112 | A1 * | 3/2009 | Basson | G06F 3/016 345/156 |
| 2009/0174573 | A1 * | 7/2009 | Smith | G08G 1/166 340/905 |
| 2012/0001742 | A1 | 1/2012 | Nozoe et al. | |
| 2012/0109454 | A1 * | 5/2012 | Fischer | B60Q 1/484 701/36 |
| 2012/0126965 | A1 | 5/2012 | Sanma et al. | |
| 2012/0191267 | A1 * | 7/2012 | Ogawa | G07C 5/085 701/1 |
| 2012/0242465 | A1 * | 9/2012 | Murata | B60Q 9/00 340/407.2 |
| 2013/0213179 | A1 | 8/2013 | Hatanaka et al. | |
| 2013/0222300 | A1 * | 8/2013 | Sanma | G06F 3/04186 345/173 |
| 2015/0158388 | A1 * | 6/2015 | Kalbus | B60K 35/00 701/36 |
| 2015/0347830 | A1 | 12/2015 | Nakata et al. | |
| 2016/0009317 | A1 * | 1/2016 | Evreinov | B62D 1/046 701/36 |
| 2018/0151074 | A1 * | 5/2018 | Noto | B60W 10/20 |

FOREIGN PATENT DOCUMENTS

| | | |
|---|---|---|
| JP | H05-2700 A | 1/1993 |
| JP | H06-305384 A | 11/1994 |
| JP | H09-132094 A | 5/1997 |
| JP | 2001-199296 A | 7/2001 |
| JP | 2005-035488 A | 2/2005 |
| JP | 2008-056136 A | 3/2008 |
| JP | 2012-014639 A | 1/2012 |
| JP | 2013-169952 A | 9/2013 |
| JP | 2015-225359 A | 12/2015 |
| WO | 2014/103272 A1 | 7/2014 |

* cited by examiner

VEHICLE AND IN-VEHICLE CONTROL METHOD

CROSS-REFERENCE TO RELATED APPLICATION

This application claims priority to and the benefit of Japanese Patent Application No. 2016-032314 filed Feb. 23, 2016, the entire contents of which are incorporated herein by reference.

TECHNICAL FIELD

The present disclosure relates to a vehicle and an in-vehicle control method.

BACKGROUND

Vehicles that perform peripheral object recognition are known. For example, a vehicle performs object recognition processing based on images captured by a plurality of camera modules, and as a result of the object recognition processing, displays the vehicle peripheral images on a display.

CITATION LIST

Patent Literature

SUMMARY

A vehicle according to a first embodiment includes a steering wheel, a steering switch disposed on the steering wheel, an other-vehicle-detector, a tactile sensation presentation unit, and a controller. The other-vehicle-detector is for detecting another vehicle. The tactile sensation presentation unit is for presenting a tactile sensation to an operator by vibrating the steering switch. The controller is configured to, according to detection by the other-vehicle-detector, cause the tactile sensation presentation unit to vibrate the steering switch to present a tactile sensation to the operator.

A vehicle according to a second embodiment includes a steering wheel, a turn signal lever, a contact detector, an other-vehicle-detector, a tactile sensation presentation unit, and a controller. The contact detector is for detecting contact to the turn signal lever. The other-vehicle-detector is for detecting another vehicle. The tactile sensation presentation unit is for presenting a tactile sensation to an operator by vibrating the steering wheel. The controller is configured to detect contact to the turn signal lever by the operator, and according to detection by the other-vehicle-detector, cause the tactile sensation presentation unit to vibrate the steering wheel to present a tactile sensation to the operator.

A vehicle according to a third embodiment includes a steering wheel, a turn signal lever, an other-vehicle-detector, a tactile sensation presentation unit, and a controller. The other-vehicle-detector is for detecting another vehicle. The tactile sensation presentation unit is for presenting a tactile sensation to an operator by vibrating the steering wheel. The controller is configured to detect an operation on the turn signal lever by the operator, and according to detection by the other-vehicle-detector, cause the tactile sensation presentation unit to vibrate the steering wheel to present a tactile sensation to the operator.

A vehicle according to a fourth embodiment includes a steering wheel, a steering switch disposed on the steering wheel, an other-vehicle-detector, a tactile sensation presentation unit, and an ECU. The other-vehicle-detector is for detecting another vehicle. The tactile sensation presentation unit is for presenting a tactile sensation to an operator by vibrating the steering switch. The ECU is for controlling the vehicle. The ECU is configured to, according to detection by the other-vehicle-detector, cause the tactile sensation presentation unit to vibrate the steering switch to present a tactile sensation to the operator.

A control method according to an embodiment is an in-vehicle control method for use in a vehicle including a steering wheel, a steering switch disposed on the steering wheel, an other-vehicle-detector for detecting another vehicle, a tactile sensation presentation unit for presenting a tactile sensation to an operator by vibrating the steering switch, and an ECU for controlling the vehicle. The control method includes a step in which the ECU, according to detection by the other-vehicle-detector, causes the tactile sensation presentation unit to vibrate the steering switch to present a tactile sensation to the operator.

DETAILED DESCRIPTION

A driver of a conventional vehicle is able to recognize objects around the vehicle by viewing a displayed vehicle peripheral image. It is desirable that the driver recognize the circumstances around the vehicle. For example, when making a lane change while the vehicle is traveling, the driving safety is improved if the circumstances around the vehicle can be recognized. The present disclosure relates to a vehicle capable of improving safety and an in-vehicle control method.

Hereinafter, a plurality of embodiments will be described in detail with reference to the accompanying drawings.

Embodiment 1

Figure 1:
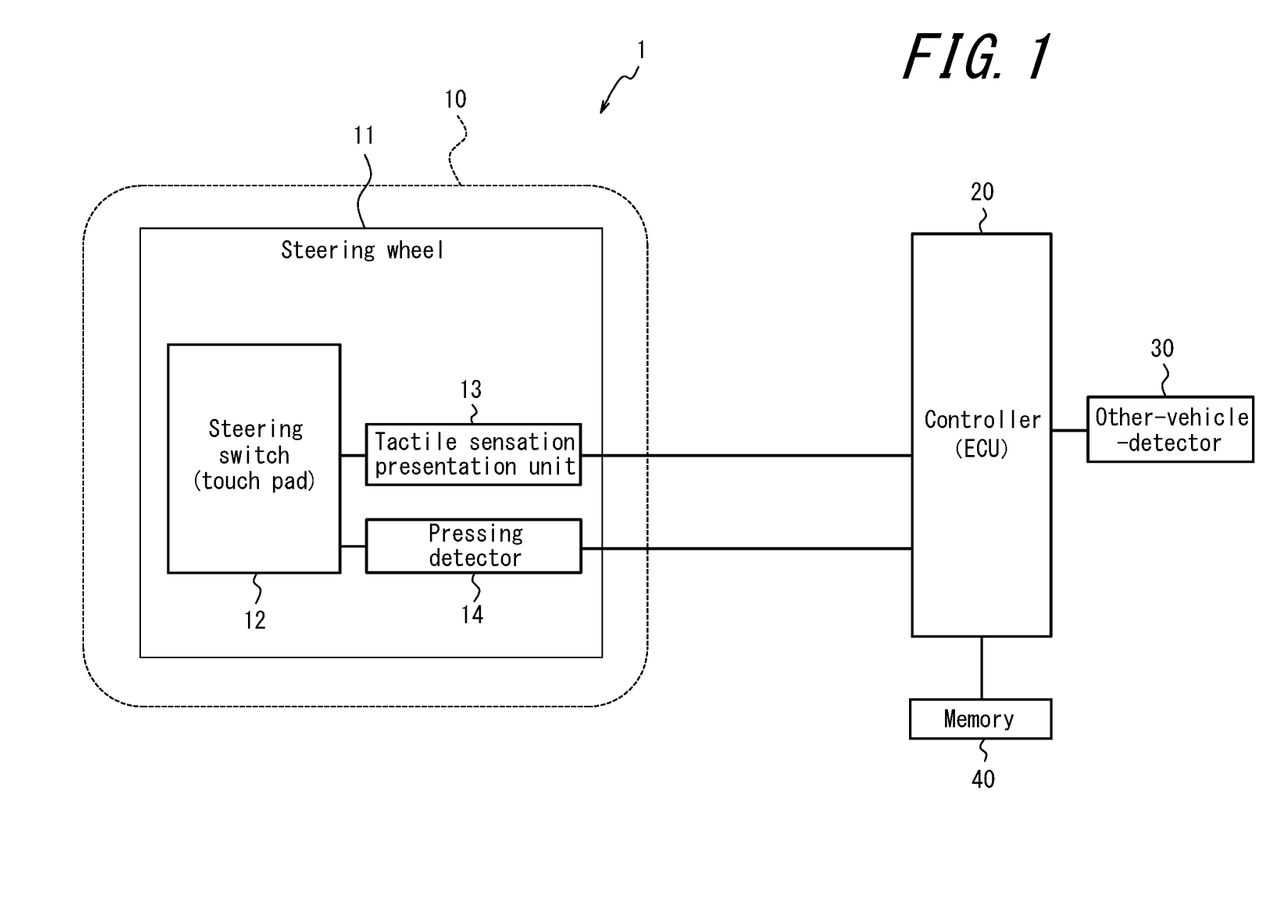
FIG. 1 is a functional block diagram illustrating the schematic configuration of a vehicle according to Embodiment 1.

FIG. 1 is a functional block diagram illustrating the schematic configuration of a vehicle according to Embodiment 1. A vehicle 1 includes a steering unit 10, a controller 20, an other-vehicle-detector 30, and a memory 40.

A driver (operator) driving the vehicle 1 performs a predetermined operation on the steering wheel when, for example, changing lane while driving (traveling). When the operation by the driver is detected, the vehicle 1 detects the presence or absence of another vehicle in the surroundings, and notifies the driver according to the detection result. Through the notification, the driver can know the presence or absence of another vehicle in the surroundings, and can know whether the lane change can be performed safely. The configuration of the vehicle 1 will be described in detail.

The steering unit 10 includes a steering wheel (handle) 11. In the present embodiment, the steering unit 10 may be constituted only by the steering wheel 11. The steering wheel 11 includes a steering switch 12, a tactile sensation presentation unit 13, and a pressing detector 14.

Figure 2:
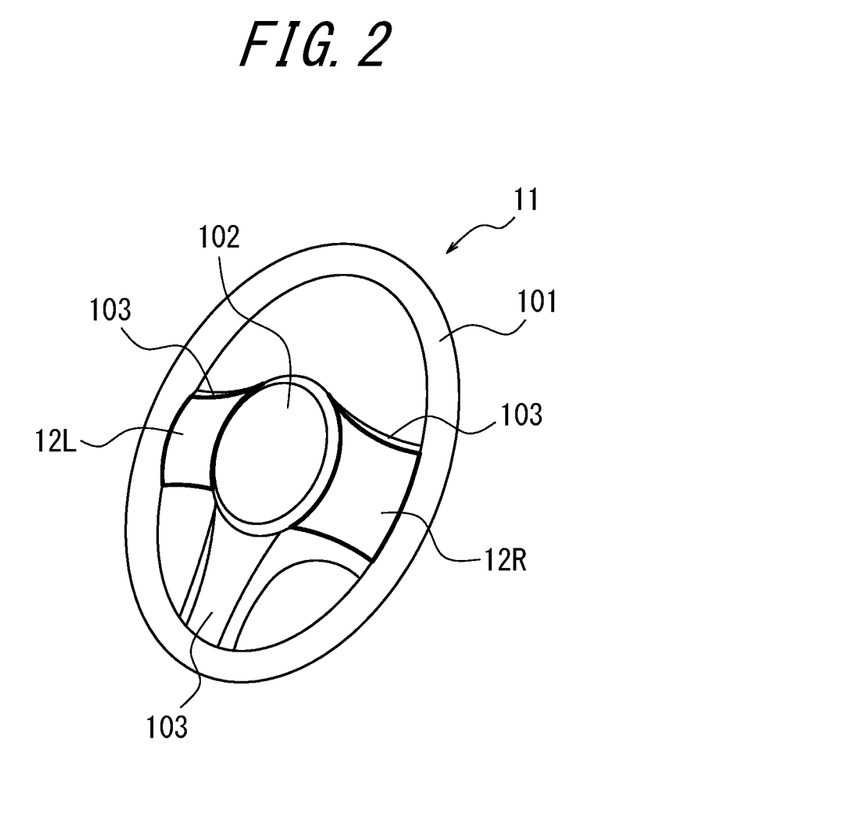
FIG. 2 is an external perspective view illustrating an example of a steering wheel.

FIG. 2 is an external perspective view illustrating an example of the steering wheel 11 of FIG. 1. As illustrated in FIG. 2, the steering wheel 11 includes a rim part 101 to be held by the driver's hands; a boss part 102 for housing an airbag apparatus, a horn switch and the like, being disposed at the center of the rim part 101 and connected to a steering shaft which is not illustrated; and a plurality of spoke parts 103 connecting the rim part 101 and the boss part 102. The steering wheel 11 includes three spoke parts 103 extending from the boss part 102 respectively in a left direction, a right direction and a downward direction with reference to the normal position of the steering wheel 11. When the steering wheel 11 is in the normal position, the tires of the vehicle 1 face the front, and the vehicle 1 can go straight ahead.

On the spoke parts 103 extending from the boss part 102 in the left direction and the right direction, steering switches 12L and 12R are respectively disposed. That is, in the present embodiment, the steering switches 12L and 12R are symmetrically arranged in the normal position of the steering wheel 11. In the normal position of the steering wheel 11, as viewed from the driver, the steering switch disposed on the right side is referred to as a steering switch 12R and the steering switch disposed on the left side is referred to as a steering switch 12L. However, when there is no need to distinguish the right steering switch 12R and the left steering switch 12L, these are referred to as a steering switch 12.

The arrangement of the steering switches 12 is not limited to that illustrated in FIG. 2, however, it is preferable that the steering switches 12 are provided at positions that can be touched by the driver's fingers when the driver holds the rim part 101 while driving. The driver of the vehicle 1, for example, can touch or press the steering switches 12 with their thumbs while holding the rim part 101 while driving.

The steering switch 12 may be constituted by a touch pad or a touch panel. In the present embodiment, the steering switch 12 is described as a touch pad. The steering switch 12 is configured to detect contact by a contact object such as the driver's finger or the like. When contact by a contact object is detected, the steering switch 12 can notify information related to the detected contact to the controller 20.

The tactile sensation presentation unit 13 includes, for example, a piezoelectric vibrator. The tactile sensation presentation unit 13 is configured to vibrate the steering switch 12. The tactile sensation presentation unit 13 is configured to present a tactile sensation to the contact object in contact with the steering switch 12 by generating vibration according to a predetermined vibration pattern. In the present embodiment, the tactile sensation presentation unit 13 generates vibration based on a drive signal supplied by the controller 20. That is, in the present embodiment, the controller 20 controls the vibration of the tactile sensation presentation unit 13.

The controller 20 may cause the tactile sensation presentation unit 13 to vibrate so as to present a tactile sensation at the position (coordinates) to which the contact object is in contact with the steering switch 12. Additionally, the controller 20 may control such that the drive signal for driving the tactile sensation presentation unit 13 differs according to, for example, the detection result related to the presence or absence of another vehicle, which will be described later. In this case, the tactile sensation presentation unit 13 vibrates with different vibration patterns according to the detection result or the like. The tactile sensation presentation unit 13 reproduces various vibration patterns by vibrating with different amplitudes, frequencies and the like based on the drive signal applied by the controller 20.

The tactile sensation presentation unit 13 may also be configured to vibrate, for example, when the steering switch 12 is pressed by the driver. Unlike a push button switch, no physical changes occur when the steering switch 12 is pressed. Therefore, it would be difficult for the driver to confirm whether the pressing has been inputted if the steering wheel 11 did not include a tactile sensation presentation unit 13. On the other hand, if the tactile sensation presentation unit 13 vibrates when the steering switch 12 is pressed, the driver can confirm whether the pressing operation has been inputted to the steering switch 12 by the vibration (tactile sensation) generated by the tactile sensation presentation unit 13 without visual confirmation.

The pressing detector 14 is configured to detect pressing against the steering switch 12 by a contact object such as the driver's finger. The pressing detector 14 is a strain gage sensor, an element such as a piezoelectric element, or the like, whose physical or electrical characteristics (distortion, resistance, voltage and the like) change according to pressing. When the pressing detector 14 is constituted by a piezoelectric element or the like, the magnitude of the voltage (voltage value) of the piezoelectric element, which is an electrical characteristic, changes according to the magnitude (alternatively, the speed at which the magnitude of the load (force) changes (acceleration)) of the load (force) relating to the pressing against the steering switch 12.

The controller 20 is configured to acquire information related to pressing, by notification from the pressing detector 14 or by detection. In other words, the controller 20 is configured to acquire information related to pressing against the steering switch 12 from the pressing detector 14. The information related to pressing may be the magnitude of the load, the power value, the resistance value or the like related to pressing, instead of the voltage value.

The tactile sensation presentation unit 13 and the pressing detector 14 may be integrated. In particular, when the tactile sensation presentation unit 13 and the pressing detector 14 are piezoelectric elements, these can be configured as a tactile sensation presentation/pressing detection unit by sharing a piezoelectric element. This is because a piezoelectric element generates a voltage when pressure is applied and deforms when a voltage is applied thereto.

When a plurality of the steering switches 12 are disposed on the steering wheel 11, as illustrated in FIG. 2, the steering wheel 11 may include a plurality of the tactile sensation presentation units 13 and a plurality of the pressing detectors 14 (the same number as the steering switch 12). Each pressing detector 14 is associated with a steering switch 12, and is configured to detect pressing against the associated steering switch 12. Further, each tactile sensation presentation unit 13 is associated with a steering switch 12, and is configured to vibrate the associated steering switch 12.

The controller 20 is a processor for controlling and managing the entire vehicle 1. The controller 20 is constituted by a processor such as a CPU (Central Processing Unit) that executes a program prescribing a control procedure, or the like. Such a program, for example, is stored in the memory 40. In the vehicle 1, the controller 20 is particularly constituted by an ECU (Electric Control Unit or Engine Control Unit).

The ECU controls the entire vehicle 1. That is, the ECU controls the other-vehicle-detector 30, and other controlled apparatuses that are not illustrated as being included in the vehicle 1. The other controlled apparatuses here may be any apparatus used in association with the vehicle 1 such as a transmission, a car air conditioner, a power window, a car navigation system, a car audio, and a head-up display. Further, the other controlled apparatuses are not limited to apparatuses preliminarily installed in the vehicle 1 and, for example, also include external apparatuses electrically connected to the vehicle 1.

The controller 20 may be constituted by one ECU, or may be constituted by, for example, a main ECU for controlling the entire vehicle 1 and a plurality of sub ECUs for controlling some of the controlled apparatuses or the like.

When pressing against the steering switch 12 is detected, the controller 20 presents a tactile sensation to the driver. More particularly, the controller 20 causes the tactile sensation presentation unit 13 to vibrate with a predetermined pattern. Through the vibration of the tactile sensation presentation unit 13, the driver can know that pressing against the steering switch 12 has been inputted.

When a predetermined operation on the steering switch 12 is detected, the controller 20 performs detection of the presence or absence of another vehicle. The predetermined operation is, for example, a pressing operation on the steering switch 12. However, the predetermined operation is not limited to pressing and, for example, may be a touch operation on the steering switch 12 or the like. The controller 20 causes the other-vehicle-detector 30 to perform detection of the presence or absence of another vehicle.

The controller 30 determines (calculates) the result of the detection of the presence or absence of another vehicle based on information related to the detection obtained from the other-vehicle-detector 30 (hereinafter, referred to as "detection information"). According to the detection result, the controller 20 presents a tactile sensation to the driver. More particularly, the controller 20 vibrates the tactile sensation presentation unit 13 with a vibration pattern according to the detection result. Through the vibration pattern, the driver can know the detection result.

The details of tactile sensation presentation according to the detection result performed by the controller 20 will be described later together with operation on the steering switch 12 by the driver.

The other-vehicle-detector 30 is configured to detect the presence or absence of another vehicle around the vehicle 1. The other-vehicle-detector 30, for example, performs detection as to whether another vehicle is present within a predetermined distance in a forward direction, a lateral direction and a rearward direction from the vehicle 1. Detection information acquired by the other-vehicle-detector 30 is transmitted to the controller 20. The other-vehicle-detector 30 is mounted at an appropriate position on the vehicle 1 in accordance with the detection principle of the other vehicle.

The other-vehicle-detector 30 may be a radar such as a laser radar, a millimeter wave radar, an ultrasonic radar or the like. When the other-vehicle-detector 30 is a laser radar, it outputs laser (light wave) and detects scattered light from other vehicles. Then, based on the scattered light detected by the other-vehicle-detector 30, the controller 20 determines the presence or absence of another vehicle and if present measures the distance thereto. When the other-vehicle-detector 30 is a millimeter wave radar, it outputs millimeter waves (radio waves) and detects reflected waves from other vehicles. Then, based on the reflected waves detected by the other-vehicle-detector 30, the controller 20 determines the presence or absence of another vehicle and if present measures the distance thereto. When the other-vehicle-detector 30 is an ultrasonic radar, it outputs ultrasonic waves, and detects reflected waves from other vehicles. Then, based on the reflected waves detected by the other-vehicle-detector 30, the controller 20 determines the presence or absence of another vehicle and if present measures the distance thereto.

The other-vehicle-detector 30 may be an apparatus other than a radar. For example, the other-vehicle-detector 30 may be an imaging apparatus such as a camera or the like. When the other-vehicle-detector 30 is an imaging apparatus, it captures images of the surroundings of the vehicle 1. Then, based on the images captured by the other-vehicle-detector 30, the controller 20 performs image processing, thereby determining the presence or absence of another vehicle and if present measuring the distance thereto. Note that the image processing may be performed by a controller provided separately by the other-vehicle-detector 30.

The other-vehicle-detector 30 does not necessarily need to detect the presence or absence of another vehicle in all directions around the vehicle 1. For example, the other-vehicle-detector 30 may detect only the presence or absence of another vehicle located in the lateral direction or the rearward direction from the vehicle 1. Then, the other-vehicle-detector 30 transmits the detection information thereof to the controller 20. Based on the acquired detection information, the controller 20 determines the presence or absence of another vehicle located in the lateral direction or the rearward direction of the vehicle 1 as a detection result.

However, even if the controller 20 determines the presence or absence of another vehicle located in the lateral direction or the rearward direction from the vehicle 1 as a detection result, the other-vehicle-detector 30 may perform detection of the presence or absence of another vehicle in all directions around the vehicle 1. That is, the other-vehicle-detector 30 performs detection of the presence or absence of another vehicle in all directions around the vehicle 1, and transmits the detection information to the controller 20. Then, based on the acquired detection information, the controller 30 may determine the detection result only related to another vehicle located in the lateral direction or the rearward direction from the vehicle 1.

In this manner, the controller 20 can determine the presence or absence of another vehicle at a position that is difficult for the driver to visually recognize, by determining the detection result related to another vehicle located in the lateral direction or the rearward direction of the vehicle 1.

The memory 40 may be constituted by a semiconductor memory, a magnetic memory or the like, and is configured to store various kinds of information, a control program executed by the controller 20 and the like. The memory 40, for example, stores a combination of a detection result determined by the controller 20 and a vibration pattern of the tactile sensation presentation unit 13 corresponding to the detection result.

Next, the details of tactile sensation presentation according to a detection result performed by the controller 20 will be described together with an operation on the steering switch 12 by the driver. Here, as an example, the case in which the driver changes the lane from a left lane to a right lane will be described. Further, as an example, the other-vehicle-detector 30 here will be described as a millimeter wave radar. Furthermore, as an example, the other-vehicle-detector 30 here will be described as being configured to perform detection of the presence or absence of another vehicle located in the lateral direction or the rearward direction from the vehicle 1.

When changing the lane, the driver presses the corresponding steering switch 12 with either one or both of the thumbs while holding the steering wheel 11. The pressing detector 14 detects the pressing against the steering switch 12 by the driver, and transmits information related to the pressing to the controller 20.

Based on the information related to the pressing, the controller 20 causes the tactile sensation presentation unit 13 to vibrate. At this time, the controller 20 causes the tactile sensation presentation unit 13 to vibrate with a predetermined vibration pattern indicating that the pressing has been inputted. Through the vibration of the tactile sensation presentation unit 13 presented to the thumb which performed the pressing, the driver can know that the pressing has been inputted.

The controller 20 that has detected the pressing then causes the other-vehicle-detector 30 to perform detection processing. That is, the controller 20 causes the other-vehicle-detector 30 to output millimeter waves and detect reflected waves of the millimeter waves. The other-vehicle-detector 30 performs the detection of the presence or absence of another vehicle located in the lateral direction or the rearward direction under the control of the controller 20. Then, the other-vehicle-detector 30 transmits information related to the reflected waves that have been detected as detection information to the controller 20. Based on the acquired detection information, the controller 20 determines the presence or absence of another vehicle and if present measures the distance thereto as a detection result.

Figure 3A:
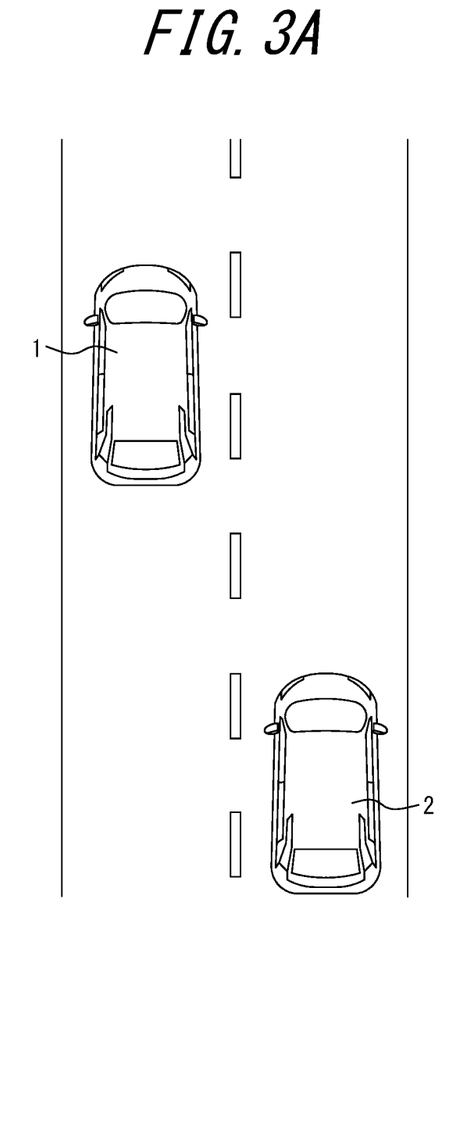
FIG. 3A and FIG. 3B illustrate an example of tactile sensation presentation according to the positional relationship between the vehicle of FIG. 1 and another vehicle.
Figure 3B:
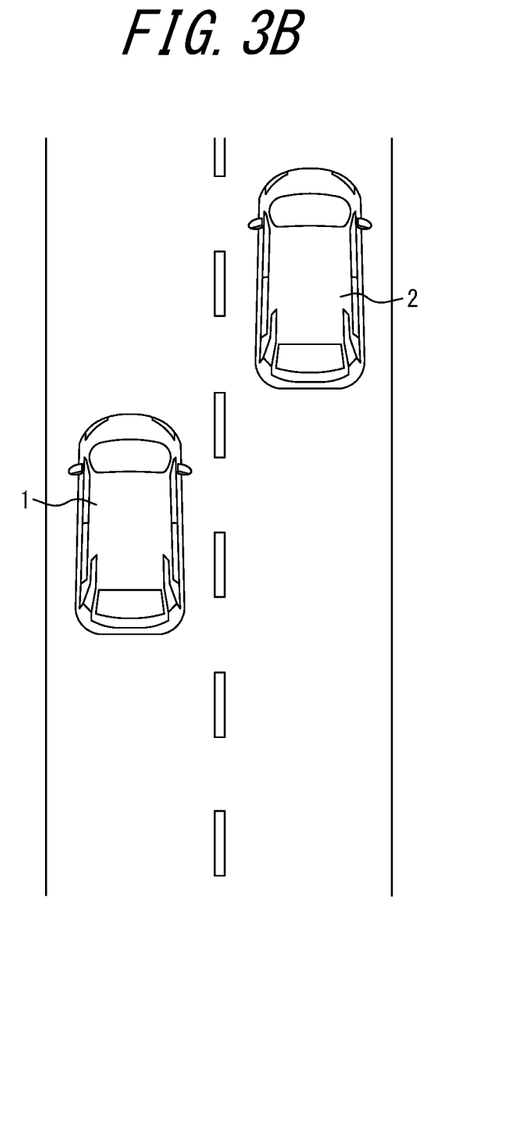

FIG. 3A and FIG. 3B illustrate an example of tactile sensation presentation according to the positional relationship between the vehicle 1 and another vehicle. For example, as illustrated in FIG. 3A, it is assumed that when the driver pressed the steering switch 12, another vehicle 2 exists on the right-rear side of the vehicle 1. In this case, the other-vehicle-detector 30 detects the presence of the other vehicle 2 by the detection processing. Based on detection information acquired from the other-vehicle-detector 30, the controller 20 determines the presence of the other vehicle 2 located to the right-rearward direction relative to the vehicle 1 as a detection result. At this time, the controller 20 also determines the distance from the vehicle 1 to the other vehicle 2.

Then, the controller 20 presents a tactile sensation to the driver operating the steering switch 12 according to the detection result. In the example illustrated in FIG. 3A, the controller 20 presents a tactile sensation to the driver by causing the tactile sensation presentation unit 13 to vibrate with a predetermined vibration pattern indicating the presence of the other vehicle 2.

The controller 20 may also cause the tactile sensation presentation unit 13 to vibrate with a vibration pattern according to the distance from the vehicle 1 to the other vehicle 2. For example, the controller 20 may cause the tactile sensation presentation unit 13 to vibrate at a higher frequency as the distance from the vehicle 1 to the other vehicle 2 is shorter. Further, for example, the controller 20 may cause the tactile sensation presentation unit 13 to vibrate with the predetermined vibration pattern at shorter intervals as the distance between the vehicle 1 and the other vehicle 2 is shorter. In this case, for example, since the tactile sensation is presented with vibration at a higher frequency as the other vehicle 2 approaches the vehicle 1, the driver is able to recognize the presence of the other vehicle 2 approaching the vehicle 1.

It is assumed that the other vehicle 2 has passed the vehicle 1, and for example, has moved to the position illustrated in FIG. 3B. Also, it is assumed that within the predetermined distance no other vehicles are present in the lateral direction or the rearward direction from the vehicle 1. In this case, based on the detection information acquired from the other-vehicle-detector 30, the controller 20 determines the absence of another vehicle located in the lateral direction or the rearward direction from the vehicle 1 as a detection result.

Then, the controller 20 causes the tactile sensation presentation unit 13 to vibrate according to the detection result. In this example, the controller 20 causes the tactile sensation presentation unit 13 to vibrate with a predetermined pattern indicating the absence of another vehicle located in the lateral direction or the rearward direction from the vehicle 1. Through the vibration, the driver is able to recognize the absence of another vehicle located in the lateral direction or the rearward direction from the vehicle 1.

After recognizing the absence of another vehicle located in the lateral direction or the rearward direction from the vehicle 1 through the tactile sensation presented via the steering switch 12, the driver performs a normal lane change operation (with a predetermined method) for the vehicle 1. In the lane change operation, the driver, for example, first operates the turn signal lever to turn on the turn signal. Then, the driver checks the circumstances around the vehicle 1 indirectly using an inner rear view mirror or an outer rear view mirror, or directly by visual confirmation. When the surrounding safety is confirmed, the driver operates the steering wheel 11 to change the lane in which the vehicle 1 travels.

Figure 4:
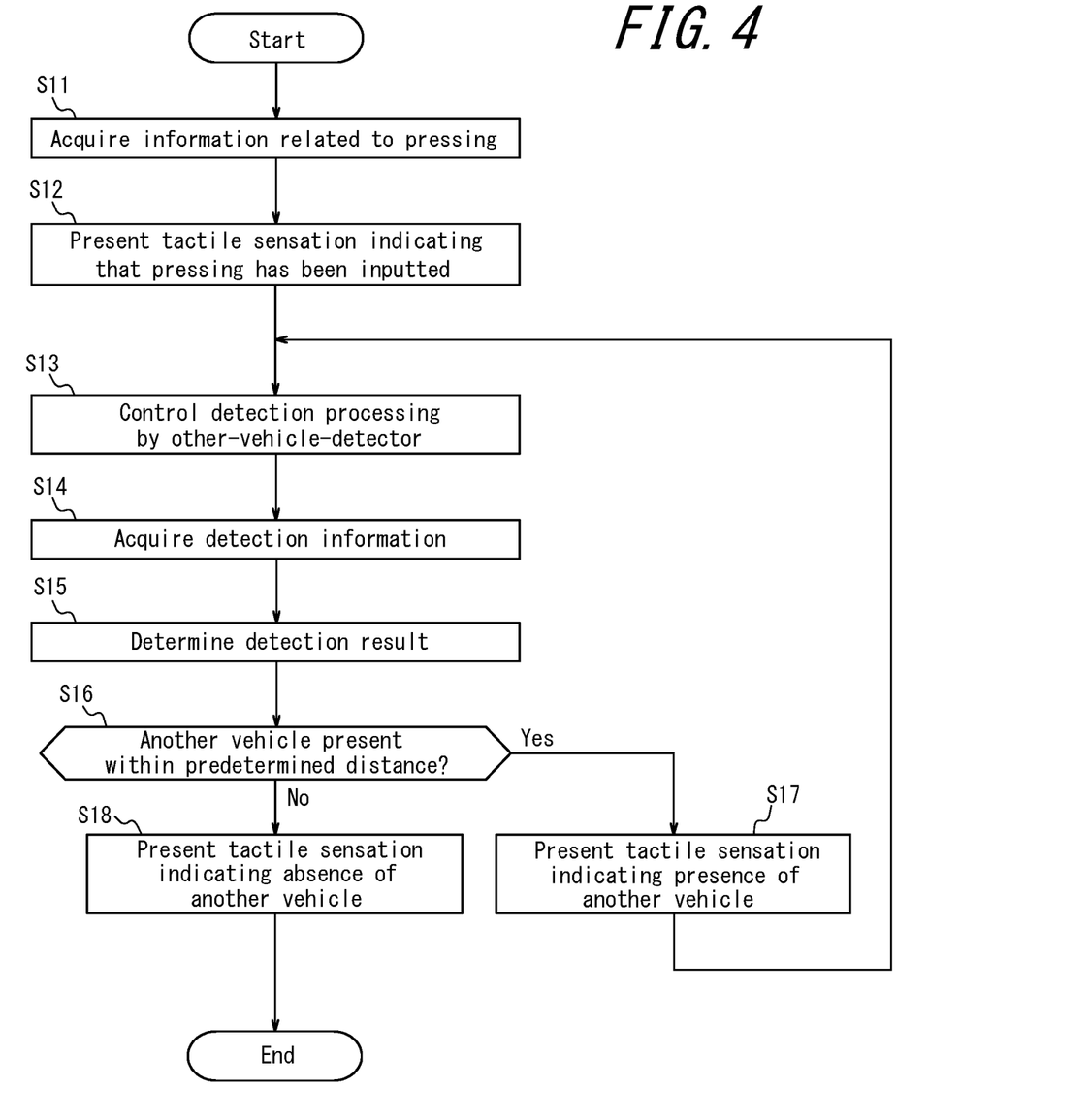
FIG. 4 is a flowchart illustrating an example of processing performed by the controller of FIG. 1.

Next, the processing performed by the controller 20 will be described. FIG. 4 is a flowchart illustrating an example of the processing performed by the controller 20 illustrated in FIG. 1. The flow of FIG. 4 may start when the driver presses the steering switch 12.

When the driver presses the steering switch 12, the controller 20 acquires information related to the pressing outputted from the pressing detector 14 (Step S11).

After acquiring the information related to the pressing, the controller 20 causes the tactile sensation presentation unit 13 to vibrate the steering switch 12, thereby presenting a tactile sensation to the driver indicating that the pressing has been inputted (Step S12). Through the presented tactile sensation, the driver is able to recognize that the pressing has been inputted.

Next, the controller 20 controls the detection processing performed by the other-vehicle-detector 30 based on the pressing by the driver (Step S13). More particularly, the controller 20 causes the other-vehicle-detector 30 to execute detection of the presence or absence of another vehicle within a predetermined distance around the vehicle 1.

Then, the controller 20 acquires detection information from the other-vehicle-detector 30 that has executed the detection (Step S14).

In addition, the controller 20 determines the detection result based on the detection information (Step S15).

Based on the determined detection result, the controller 20 determines the presence or absence of another vehicle within the predetermined distance around the vehicle 1 (Step S16).

When the presence of another vehicle within the predetermined distance around the vehicle 1 is determined (Step S16: Yes), the controller 20 causes the tactile sensation presentation unit 13 to vibrate the steering switch 12, thereby presenting a tactile sensation indicating the presence of another vehicle to the driver (Step S17). Here, the controller 20 may cause different tactile sensations to be presented according to the distance between the vehicle 1 and the other vehicle. Through the presented tactile sensation, the driver is able to recognize that the lane should not be changed since there is another vehicle around the vehicle 1. In this case, the flow returns to Step S13, and the controller 20 causes the other-vehicle-detector 30 to execute the detection processing again.

On the other hand, when the absence of another vehicle within the predetermined distance around the vehicle 1 is determined (Step S16: No), the controller 20 causes the tactile sensation presentation unit 13 to vibrate the steering switch 12, thereby presenting a tactile sensation indicating the absence of another vehicle to the driver (Step S18). In this case, the flow ends. Through the presented tactile sensation, the driver is able to recognize that the lane can be changed since there are no other vehicles around the vehicle 1. After recognizing that the lane can be changed, the driver can perform a normal lane change operation with respect to the vehicle 1.

As described above, according to the vehicle 1 of the present embodiment, the controller 20 detects the presence or absence of another vehicle using the other-vehicle-detector 30 based on the pressing against the steering switch 12 by the driver, and presents a tactile sensation to the driver via the steering switch 12 based on the detection result. Since the tactile sensation differs according to the detection result, the driver is able to recognize the presence or absence of another vehicle based on the tactile sensation, without using a mirror or viewing directly to check the surrounding situation. In this way, the driver can perform an operation such as a lane change or the like with a predetermined method when the absence of another vehicle has been recognized through the tactile sensation. Therefore, according to the vehicle 1, safety can be improved.

In addition, according to the vehicle 1, since the driver is able to recognize the presence or absence of another vehicle without using a mirror or viewing directly to check the surrounding situation, for example, it is unnecessary to check the situation around the vehicle 1 repeatedly until it becomes safe to change the lane. In other words, since the driver is able to recognize whether or not it is safe to change the lane by the tactile sensation of the steering switch 12, it becomes easier to concentrate on checking the situation ahead while driving.

Note that the controller 20 may also be configured to present a tactile sensation to the driver according to the detection result of a predetermined area around the vehicle 1. The control of the controller 20 in this case, together with the operation on the steering switch 12 by the driver, will be described next as Embodiment 2.

Embodiment 2

In Embodiment 2, the controller 20 is configured to determine the detection result for a predetermined area around the vehicle 1, based on the operation (pressing) on the steering switch 12 by the driver. More particularly, the controller 20 is configured to determine the detection result for the predetermined area associated with the pressed steering switch 12R or 12L among the two steering switches 12R and 12L disposed on the steering wheel 11.

In the present embodiment, for example, among the left and right steering switches 12 disposed on the steering wheel 11, the steering switch 12R disposed on the right side is associated with the area on the right side of the vehicle 1, and the steering switch 12L disposed on the left side is associated with the area on the left side of the vehicle 1. Note that the relationship between the steering switches 12 and the areas is not limited to this.

In the present embodiment, when changing lane to the right lane, the driver presses the right steering switch 12R without pressing the left steering switch 12L. After acquiring information related to the pressing from the pressing detector 14 according to the pressing by the driver, the controller 20 causes the tactile sensation presentation unit 13 to vibrate with a predetermined pattern, thereby presenting a tactile sensation to the driver via the pressed right steering switch 12R. Through the tactile sensation presented via the right steering switch 12R, the driver is able to recognize that the pressing has been inputted to the right steering switch 12R.

Figure 5:
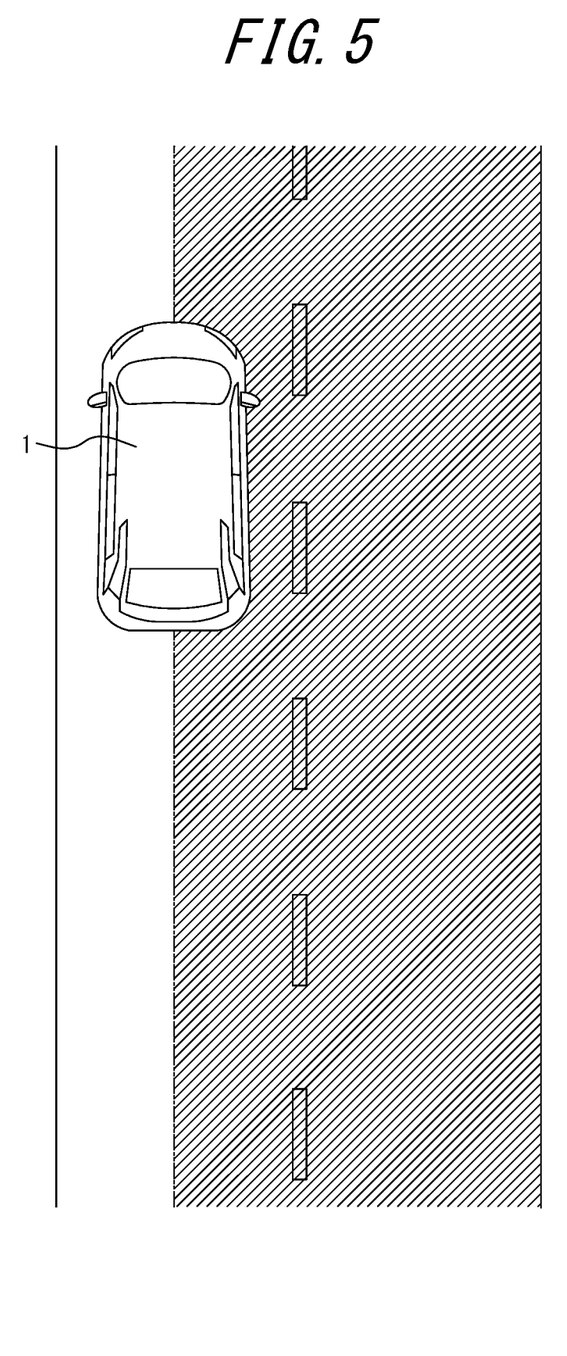
FIG. 5 illustrates an example of scanning of a predetermined area performed by a vehicle according to Embodiment 2.

In addition, after acquiring information related to the pressing against the right steering switch 12R, the controller 20 causes the other-vehicle-detector 30 to execute detection of the presence or absence of another vehicle for the area on the right side of the vehicle 1 associated with the steering switch 12R. An example of the area on the right side of the vehicle 1 for which the controller 20 performs the detection is indicated in FIG. 5 by oblique lines.

The controller 20, for example, causes the other-vehicle-detector 30 to execute detection of the presence or absence of another vehicle within a predetermined distance with respect to the area on the right side of the vehicle 1, and based on detection information acquired from the other-vehicle-detector 30 determines the presence or absence of another vehicle in the area on the right side of the vehicle 1 as a detection result.

Then, the controller 20 presents a tactile sensation to the driver by causing the tactile sensation presentation unit 13 to vibrate with a predetermined pattern according to the detection result. At this time, the controller 20 may present the tactile sensation via only the pressed right steering switch 12R, or via both the left steering switch 12L and the right steering switch 12R. Through the tactile sensation presented by the steering switch 12, the driver is able to recognize the presence or absence of another vehicle within the predetermined distance with respect to the area on the right side of the vehicle 1.

Upon recognizing the absence of another vehicle within the predetermined distance with respect to the area on the right side of the vehicle 1 through the presented tactile sensation via the steering switch 12, the driver performs an operation to change lane to the right lane with respect to the vehicle 1.

In the present embodiment, when changing the lane to the left lane, the driver presses the left steering switch 12L. As with the case described above, the controller 20 presents a tactile sensation to the driver indicating that pressing is inputted via the left steering switch 12L, and executes detection of the presence or absence of another vehicle with respect to the area on the left side of the vehicle 1 associated with the steering switch 12L. Then, based on the detection result, the controller 20 presents a tactile sensation to the driver.

Figure 6:
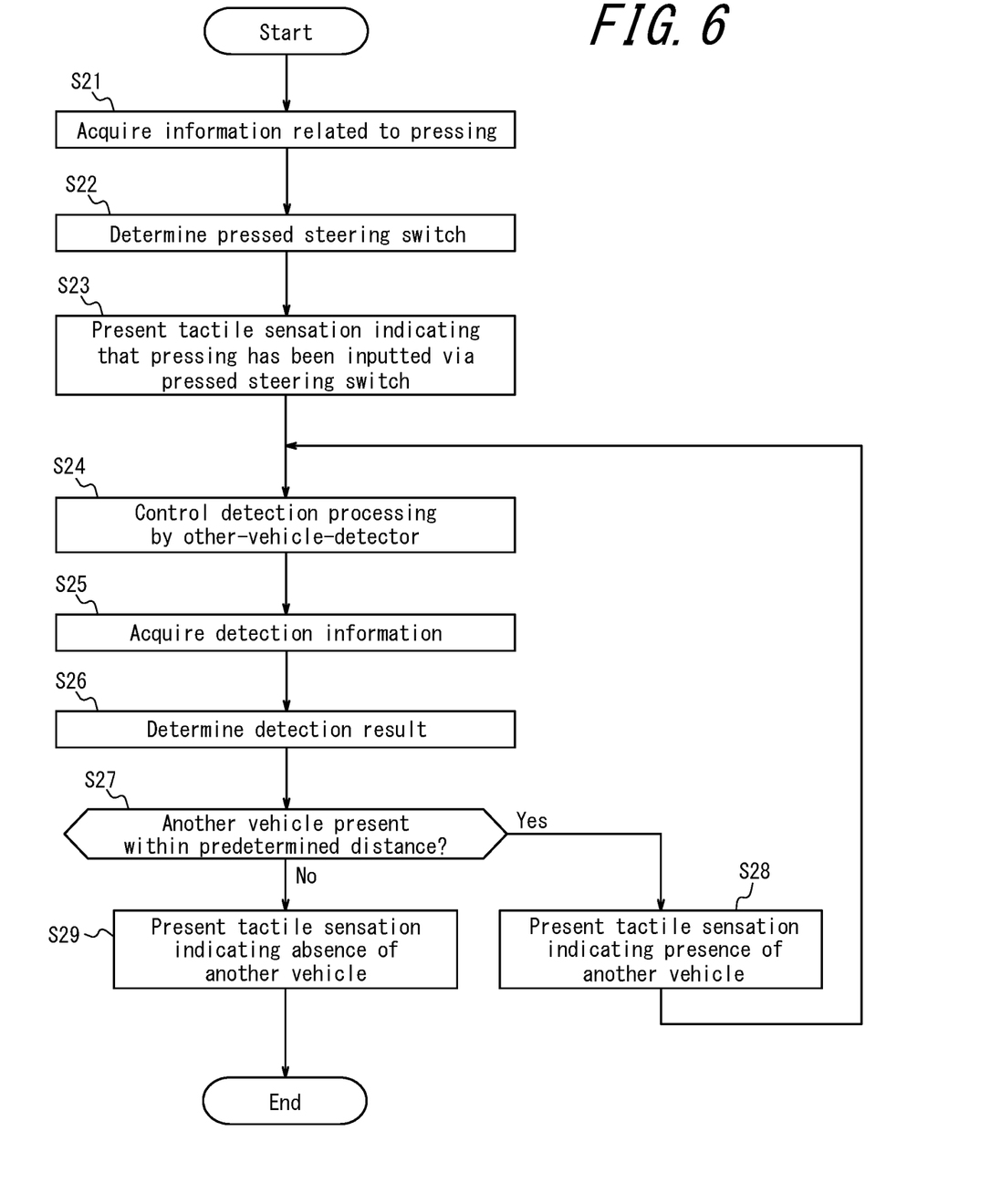
FIG. 6 is a flowchart illustrating an example of processing performed by a controller included in the vehicle according to Embodiment 2.

Next, the processing performed by the controller 20 of the vehicle 1 according to Embodiment 2 will be described. FIG. 6 is a flowchart illustrating an example of the processing performed by the controller 20 of the vehicle 1 according to the present embodiment. The flow of FIG. 6 may start when the driver presses the steering switch 12.

Initially, the controller 20 acquires information related to the pressing outputted from the pressing detector 14 (Step S21).

Based on the acquired information related to the pressing, the controller 20 determines the pressed steering switch 12 (Step S22).

Then, the controller 20 causes the tactile sensation presentation unit 13 to vibrate the determined steering switch 12, thereby presenting a tactile sensation to the driver indicating that the pressing has been inputted (Step S23).

Then in Steps S24 to S29, the controller 20 performs detection of the presence or absence of another vehicle, and presents a tactile sensation to the driver via the steering switch 12 according to the detection result. Since Steps S24 to S29 are respectively similar to Steps S13 to S18 in FIG. 4, the description thereof will be omitted. However, the present embodiment is different from Embodiment 1 in that the controller 20 performs the detection of the area corresponding to the steering switch 12 determined in Step S22.

As described above, according to the vehicle 1 of the present embodiment, the controller 20 detects the presence or absence of another vehicle in a predetermined area to which the driver intends to change lane based on the pressing against the steering switch 12 by the driver, and then presents a tactile sensation to the driver based on the detection result by vibrating the steering switch 12. Therefore, the driver is able to recognize the presence or absence of another vehicle in the direction in which the vehicle 1 is to be moved by the lane change without using a mirror or viewing directly to check the surrounding situation. Upon recognizing the absence of another vehicle in the direction in which the lane is to be changed through the tactile sensation, the driver can operate the lane change or the like with the predetermined method. Therefore, according to the vehicle 1, safety can be improved.

Embodiment 3

Figure 7:
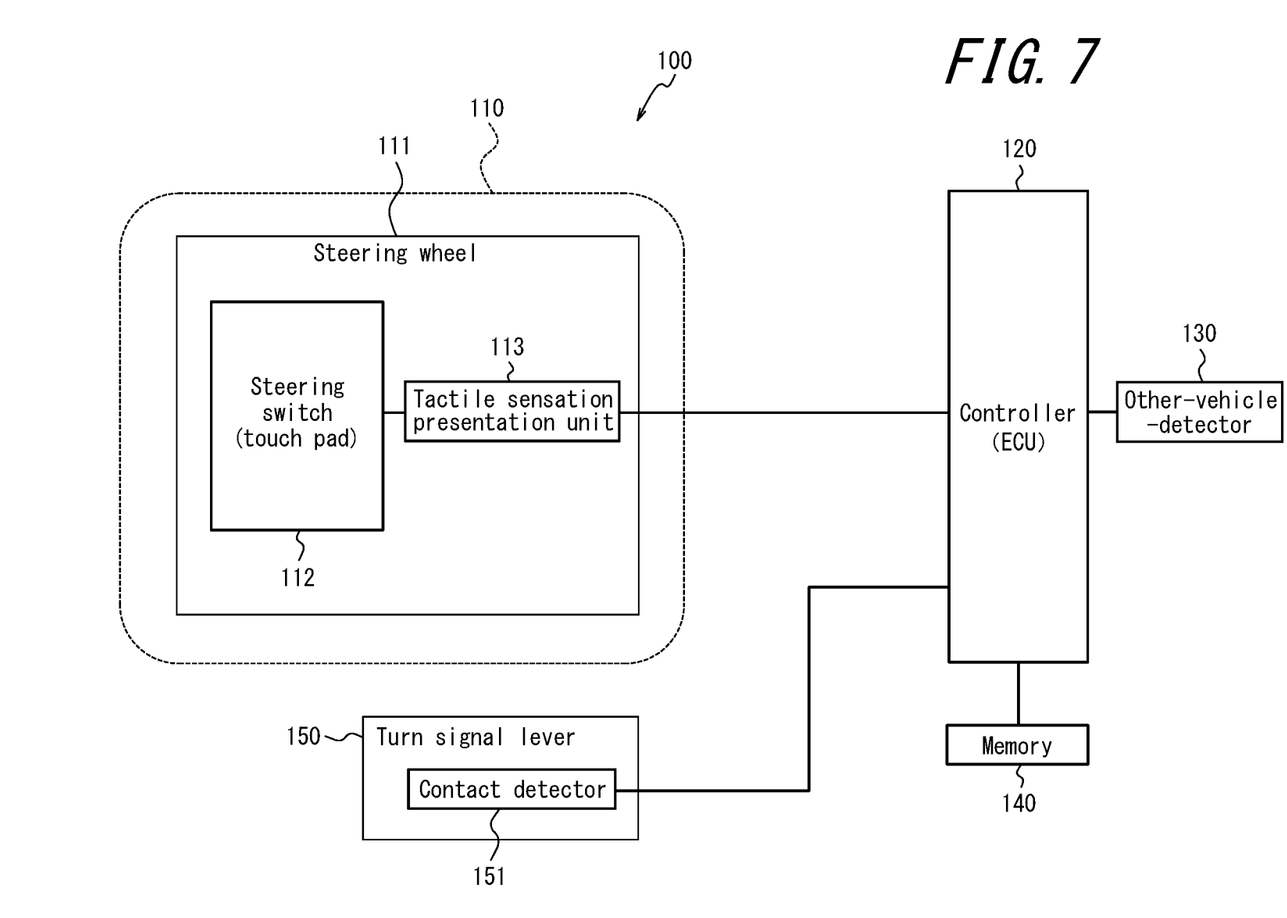
FIG. 7 is a functional block diagram illustrating the schematic configuration of a vehicle according to Embodiment 3.

FIG. 7 is a functional block diagram illustrating the schematic configuration of a vehicle 100 according to Embodiment 3. The vehicle 100 includes a steering unit 110, a controller 120, an other-vehicle-detector 130, a memory 140, and a turn signal lever 150. Hereinafter, points similar to those of Embodiment 1 will be omitted as appropriate, and different points will be described.

Unlike the steering wheel 11 of Embodiment 1, the steering wheel 111 of Embodiment 3 does not include a pressing detector. However, the steering wheel 111 may include a pressing detector, for example, when the controller 120 is configured to execute a predetermined control in response to pressing against the steering switch 112 by the driver.

The configuration, functions and the like of the tactile sensation presentation unit 113 included in the steering wheel 111 are similar to those of the tactile sensation presentation unit 13 in Embodiment 1, and thus the description thereof will be omitted.

Further, the configurations, functions and the like of the other-vehicle-detector 130 and the memory 140 are similar to those of the other-vehicle-detector 30 and the memory 40 respectively in Embodiment 1, thus the description thereof will be omitted.

Figure 8:
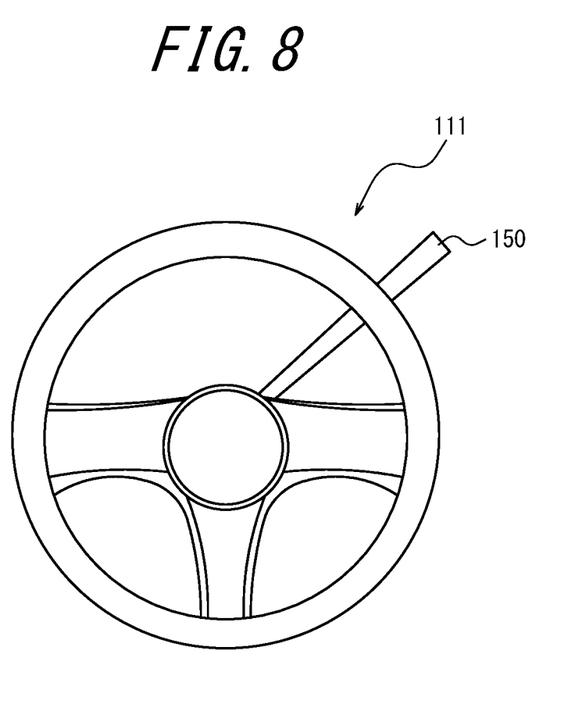
FIG. 8 schematically illustrates a steering wheel and a turn signal lever of the vehicle according to Embodiment 3.

The turn signal lever 150 is an operation lever for operating direction indicators of the vehicle 100. The turn signal lever 150 may be provided on a steering column. FIG. 8 schematically illustrates the steering wheel 111 and the turn signal lever 150 in the front view of the steering wheel 111. When the turn signal lever 150 is provided at the position illustrated in FIG. 8, the driver can operate the turn signal lever 150 with the right hand while holding the steering wheel 111 with the left hand during driving.

Referring again to FIG. 7, the turn signal lever 150 includes a contact detector 151. The contact detector 151 is for detecting contact to the turn signal lever 150 by the driver. That is, when the driver touches the turn signal lever 150 to operate a direction indicator, the contact detector 151 detects the touch. The contact detector 151 may be a contact sensor. When detecting that the driver touched the turn signal lever 150, the contact detector 151 transmits a signal indicating that the driver touched the turn signal lever 150 (hereinafter, also referred to as "contact signal") to the controller 120.

Unlike Embodiment 1, the controller 120 in the present embodiment is configured to detect the presence or absence of another vehicle when receiving a contact signal from the contact detector 151. The detection of the presence or absence of another vehicle executed by the controller 120 is similar to the detection of the presence or absence of another vehicle executed by the controller 20 in Embodiment 1. That is, the controller 120 is configured to cause the other-vehicle-detector 130 to execute detection of the presence or absence of another vehicle, and then acquire detection information detected by the other-vehicle-detector 130. Then, the controller 120 determines the detection result based on the detection information. Subsequently, the controller 120 presents a tactile sensation to the driver via the steering switch 112 by causing the tactile sensation presentation unit 113 to vibrate with a predetermined vibration pattern according to the detection result.

Figure 9:
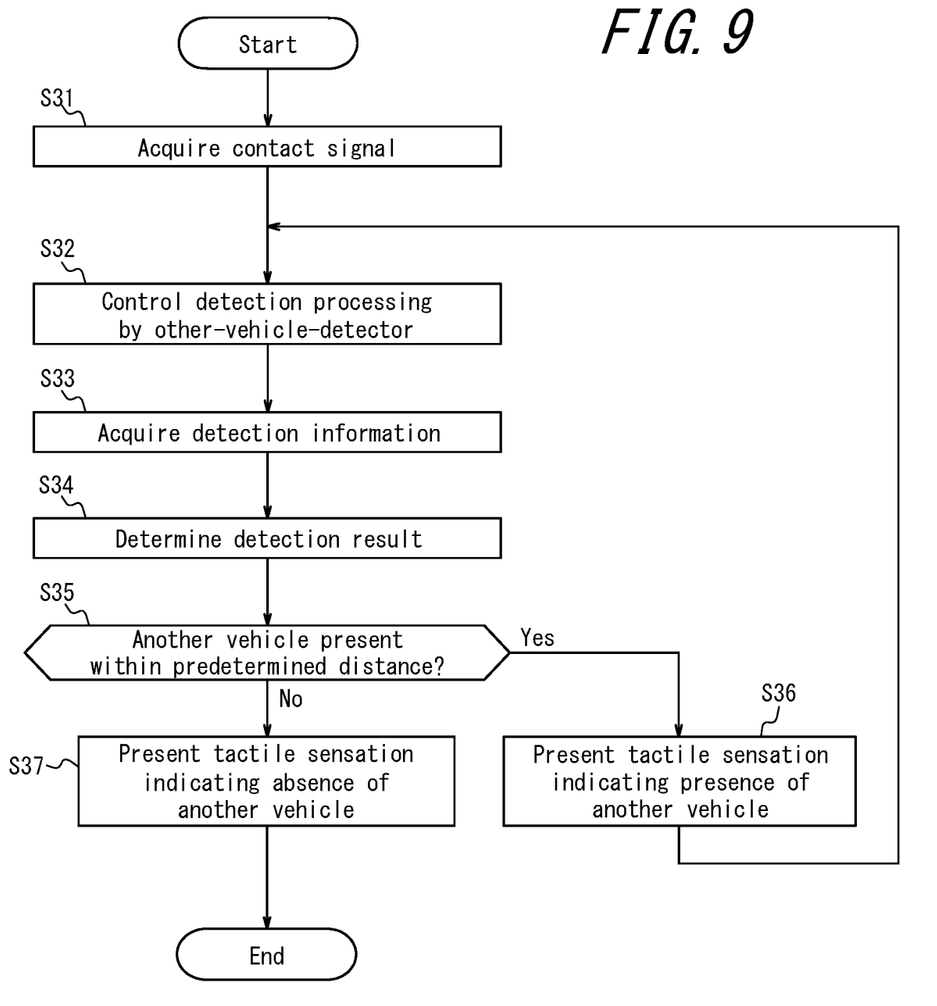
FIG. 9 is a flowchart illustrating an example of processing performed by the controller of FIG. 7.

Next, the processing performed by the controller 120 will be described. FIG. 9 is a flowchart illustrating an example of the processing performed by the controller 120 illustrated in FIG. 7. The flow in FIG. 9 may start when the driver touches the turn signal lever 150.

When the driver touches the turn signal lever 150, the controller 120 acquires the contact signal outputted from the contact detector 151 (Step S31).

The controller 120 that has acquired the contact signal then performs detection of the presence or absence of another vehicle in Steps S32 to S37, and presents a tactile sensation to the driver via the steering switch 112 according to the detection result. Steps S32 to S37 are respectively similar to Steps S13 to S18 in FIG. 4, thus the description thereof will be omitted.

As described above, according to the vehicle 100 of the present embodiment, the controller 120 performs the detection of the presence or absence of another vehicle when the driver has touched the turn signal lever 150, and then presents a tactile sensation to the driver via the steering switch 112 based on the detection result. Therefore, for example, when the driver has touched the turn signal lever 150 to operate it to change the lane, it is possible for the driver to recognize the presence or absence of another vehicle through a tactile sensation presented via the steering switch 112 without using a mirror or viewing directly to check the surrounding situation. When recognizing the absence of another vehicle in the direction in which the lane is to be changed through the tactile sensation, the driver can operate the lane change or the like with a predetermined method. Therefore, according to the vehicle 100, safety can be improved.

However, in Embodiment 3, the timing at which the controller 120 performs detection of the presence or absence of another vehicle is not necessarily limited to when the driver has touched the turn signal lever 150. For example, the controller 120 may perform detection of the presence or absence of another vehicle when the driver actually has operated the turn signal lever 150. When the driver has operated the turn signal lever 150, the turn signal lever 150 transmits a signal indicating that the turn signal lever 150 was operated (hereinafter, also referred to as "operation signal") to the controller 120. Upon receiving the operation signal, the controller 120 performs detection of the presence or absence of another vehicle, and presents a tactile sensation to the driver via the steering switch 112 according to the detection result. With such a configuration, the vehicle 100 can cause the driver to recognize the presence or absence of another vehicle at the stage where the driver actually indicates an intention to change the course of the vehicle 100, such as lane change or the like.

In this case, the controller 120 may, based on the operation contents on the turn signal lever 150, determine the detection result as to the presence or absence of another vehicle in a predetermined area. For example, when the driver has operated the turn signal lever 150 to turn on the right direction indicator of the vehicle 100, the controller 120 executes detection of the presence or absence of another vehicle with respect to the area on the right side of the vehicle 100. Also, when the driver has operated the turn signal lever 150 to turn on the left direction indicator of the vehicle 100, the controller 120 executes detection of the presence or absence of another vehicle with respect to the area on the left side of the vehicle 100. The controller 120 can execute detection of the presence or absence of another vehicle in a predetermined area, for example, with the same method as that described in Embodiment 2. According to the detection result, the controller 120 presents a tactile sensation via the steering switch 112. With such a configuration, the vehicle 100 can cause the driver to recognize the presence or absence of another vehicle in the direction in which the driver has used the turn signal lever 150 to indicate the intention to change course.

Note that the present disclosure is not limited to the above embodiments, and various changes and modifications are applicable. For example, functions and the like included in various components, steps and the like may be reordered in any logically consistent way. Furthermore, components or steps may be combined into one or divided.

For example, in each of the above embodiments, the controller may present a tactile sensation to the driver via the steering switch based on the detection result of an approaching vehicle among other vehicles that have been detected which approaches the vehicle itself. More particularly, the controller determines whether or not another vehicle is approaching the vehicle based on the detection information, and when another vehicle is determined to be approaching, causes the tactile sensation presentation unit to vibrate with a predetermined pattern based on the distance thereto, the approaching speed thereof and the like. With such a configuration, the driver is able to recognize the approaching vehicle approaching the vehicle itself based on the tactile sensation without using a mirror or viewing directly to check the surrounding situation. In this way, the driver can perform an operation such as a lane change or the like with a predetermined method when recognizing the absence of an approaching vehicle through tactile sensation. Therefore, according to the vehicle with such a configuration, safety can be improved.

In addition, as a variation of the vehicle according to the above embodiments, the vehicle may not present a tactile sensation when it is determined that no other vehicles exist.

The invention claimed is:
1. A vehicle, comprising:
a steering wheel;
a steering switch disposed on the steering wheel;
an other-vehicle-detector for detecting another vehicle;
a tactile sensation presentation unit for presenting a tactile sensation to an operator by vibrating the steering switch; and
a controller configured to
acquire information related to a pressing of the steering switch,
control the other-vehicle-detector to execute detection of the presence or absence of an other vehicle within a predetermined distance around the vehicle,
upon determining that the other vehicle is within the predetermined distance around the vehicle, cause the tactile sensation presentation unit to vibrate the steering switch to present a first tactile sensation to the operator, and
upon determining that the other vehicle is not within the predetermined distance around the vehicle, cause the tactile sensation presentation unit to vibrate the steering switch to present a second tactile sensation to the operator, wherein
the first tactile sensation is different from the second tactile sensation,
the steering switch is disposed on both a right side and a left side of the steering wheel, and
the controller is configured to, according to detection by the other-vehicle-detector in response to an operation, cause the tactile sensation presentation unit to vibrate the steering switch to present to the operator the first tactile sensation corresponding to a distance to the other vehicle.

2. The vehicle according to claim 1, wherein the operation is either contact to the steering switch or pressing against the steering switch.

3. The vehicle according to claim 1, wherein the controller is configured to, based on detection of another vehicle located in a lateral direction or a rearward direction from the vehicle by the other-vehicle-detector, cause the tactile sensation presentation unit to vibrate the steering switch to present the first tactile sensation to the operator.

4. The vehicle according to claim 1, wherein the controller is configured to, based on detection of an approaching vehicle, cause the tactile sensation presentation unit to vibrate the steering switch to present the first tactile sensation to the operator.

5. A vehicle, comprising:
a steering wheel;
a turn signal lever;
a contact detector for detecting contact to the turn signal lever;
an other-vehicle-detector for detecting another vehicle;

a tactile sensation presentation unit for presenting a tactile sensation to an operator by vibrating the steering wheel; and a controller configured to detect contact to the turn signal lever by the operator, control the other-vehicle-detector to execute detection of the presence or absence of an other vehicle within a predetermined distance around the vehicle, upon determining that the other vehicle is within the predetermined distance around the vehicle, cause the tactile sensation presentation unit to vibrate the steering wheel to present a first tactile sensation to the operator, and upon determining that the other vehicle is not within the predetermined distance around the vehicle, cause the tactile sensation presentation unit to vibrate the steering wheel to present a second tactile sensation to the operator, wherein the first tactile sensation is different from the second tactile sensation, and the controller is configured to, according to detection by the other-vehicle-detector in response to an operation, cause the tactile sensation presentation unit to vibrate the steering wheel to present to the operator the first tactile sensation corresponding to a distance to the other vehicle.

6. A vehicle, comprising:

a steering wheel;

a turn signal lever;

an other-vehicle-detector for detecting another vehicle;

a tactile sensation presentation unit for presenting a tactile sensation to an operator by vibrating the steering wheel; and a controller configured to detect an operation on the turn signal lever by the operator, control the other-vehicle-detector to execute detection of the presence or absence of an other vehicle within a predetermined distance around the vehicle, upon determining that the other vehicle is within the predetermined distance around the vehicle, cause the tactile sensation presentation unit to vibrate the steering wheel to present a first tactile sensation to the operator, and upon determining that the other vehicle is not within the predetermined distance around the vehicle, cause the tactile sensation presentation unit to vibrate the steering wheel to present a second tactile sensation to the operator, wherein the first tactile sensation is different from the second tactile sensation, and the controller is configured to, according to detection by the other-vehicle-detector in response to an operation, cause the tactile sensation presentation unit to vibrate the steering wheel to present to the operator the first tactile sensation corresponding to a distance to the other vehicle.

7. A vehicle, comprising:

a steering wheel, a steering switch disposed on the steering wheel, an other-vehicle-detector for detecting another vehicle, a tactile sensation presentation unit for presenting a tactile sensation to an operator by vibrating the steering switch, and an ECU for controlling the vehicle; wherein the ECU is configured to acquire information related to a pressing of the steering switch, control the other-vehicle-detector to execute detection of the presence or absence of an other vehicle within a predetermined distance around the vehicle, upon determining that the other vehicle is within the predetermined distance around the vehicle, cause the tactile sensation presentation unit to vibrate the steering switch to present a first tactile sensation to the operator, and upon determining that the other vehicle is not within the predetermined distance around the vehicle, cause the tactile sensation presentation unit to vibrate the steering switch to present a second tactile sensation to the operator, wherein the first tactile sensation is different from the second tactile sensation, the steering switch is disposed on both a right side and a left side of the steering wheel, and the controller is configured to, according to detection by the other-vehicle-detector in response to an operation, cause the tactile sensation presentation unit to vibrate the steering switch to present to the operator the first tactile sensation corresponding to a distance to the other vehicle.

8. An in-vehicle control method for use in a vehicle including a steering wheel, a steering switch disposed on the steering wheel, an other-vehicle-detector for detecting another vehicle, a tactile sensation presentation unit for presenting a tactile sensation to an operator by vibrating the steering switch, and an ECU for controlling the vehicle; comprising acquiring information related to a pressing of the steering switch, controlling the other-vehicle-detector to execute detection of the presence or absence of an other vehicle within a predetermined distance around the vehicle, upon determining that the other vehicle is within the predetermined distance around the vehicle, causing the tactile sensation presentation unit to vibrate the steering switch to present a first tactile sensation to the operator, and upon determining that the other vehicle is not within the predetermined distance around the vehicle, causing the tactile sensation presentation unit to vibrate the steering switch to present a second tactile sensation to the operator, wherein the first tactile sensation is different from the second tactile sensation;

the steering switch is disposed on both a right side and a left side of the steering wheel, and according to detection by the other-vehicle-detector in response to an operation, causing the tactile sensation presentation unit to vibrate the steering switch to present to the operator the first tactile sensation corresponding to a distance to the other vehicle.

* * * * *